(12) United States Patent
Ueda et al.

(10) Patent No.: US 12,377,316 B2
(45) Date of Patent: Aug. 5, 2025

(54) PHYSICAL MOTION FEEDBACK APPARATUS, PHYSICAL MOTION FEEDBACK METHOD, AND PROGRAM

(71) Applicant: NIPPON TELEGRAPH AND TELEPHONE CORPORATION, Tokyo (JP)

(72) Inventors: Hiroshi Ueda, Tokyo (JP); Makio Kashino, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 744 days.

(21) Appl. No.: 17/615,006

(22) PCT Filed: May 31, 2019

(86) PCT No.: PCT/JP2019/021731
§ 371 (c)(1),
(2) Date: Nov. 29, 2021

(87) PCT Pub. No.: WO2020/240821
PCT Pub. Date: Dec. 3, 2020

(65) Prior Publication Data
US 2022/0219043 A1 Jul. 14, 2022

(51) Int. Cl.
*G09B 19/00* (2006.01)
*A63B 24/00* (2006.01)
*G06V 40/20* (2022.01)

(52) U.S. Cl.
CPC .......... *A63B 24/0006* (2013.01); *G06V 40/23* (2022.01); *A63B 2024/0015* (2013.01); *A63B 2220/62* (2013.01)

(58) Field of Classification Search
CPC .......... A63B 24/006; A63B 2024/0015; G06V 40/23; G09B 19/003
See application file for complete search history.

(56) References Cited

U.S. PATENT DOCUMENTS

2004/0209698 A1* 10/2004 Ueda ................... A63B 24/0006
473/150
2010/0261146 A1* 10/2010 Kim ................... A63B 24/0006
345/158

(Continued)

OTHER PUBLICATIONS

Bernard S. Lee (1951) "Artificial stutter" Journal of Speech & Hearing Disorders, vol. 16, No. 1, pp. 53-55.

(Continued)

*Primary Examiner* — Peter R Egloff (57) ABSTRACT

A technique for feeding back an image obtained by modulating a motion of a subject in real time is provided. A physical exertion feedback device includes: a modulation unit configured to generate, as a modulated image, an image reflecting modulated motion time-series data, the modulated motion time-series data being obtained by modulating data within a partial time period of input motion time-series data representing a motion of a subject, using reference motion time-series data representing a motion of a teacher, the modulated motion time-series data representing a motion for correcting the motion of the subject; and a presentation unit configured to present the modulated image to the subject, wherein the modulated motion time-series data is, at respective time points from a time point at which the subject starts the motion to a predetermined time point which is hereinafter referred to as a modulation start time point, motion time-series data that matches the input motion time-series data, and is, at respective time points after the modulation start time point, motion time-series data obtained by modulating the input motion time-series data using a predetermined modulation method.

6 Claims, 5 Drawing Sheets

(56) References Cited

U.S. PATENT DOCUMENTS

| | | | | |
|---|---|---|---|---|
| 2010/0303303 | A1* | 12/2010 | Shen | G06V 40/20 |
| | | | | 382/107 |
| 2012/0206577 | A1* | 8/2012 | Guckenberger | G09B 19/003 |
| | | | | 348/47 |
| 2013/0225305 | A1* | 8/2013 | Yang | H04N 13/30 |
| | | | | 463/32 |
| 2016/0101321 | A1* | 4/2016 | Aragones | G09B 19/0038 |
| | | | | 434/257 |
| 2017/0061817 | A1* | 3/2017 | Mettler May | A61B 5/1124 |
| 2017/0177930 | A1* | 6/2017 | Holohan | G06T 7/251 |
| 2017/0189784 | A1* | 7/2017 | Sasaki | G09B 19/003 |
| 2018/0315329 | A1* | 11/2018 | D'Amato | G09B 5/02 |
| 2018/0357472 | A1* | 12/2018 | Dreessen | G06V 20/49 |
| 2019/0019321 | A1* | 1/2019 | Thielen | G09B 19/0038 |
| 2019/0043385 | A1* | 2/2019 | Inoue | G09B 19/24 |
| 2019/0279525 | A1* | 9/2019 | Weiss | G09B 19/0015 |
| 2019/0325780 | A1* | 10/2019 | Kim | G06N 5/04 |
| 2020/0005544 | A1* | 1/2020 | Kim | G06T 13/40 |

OTHER PUBLICATIONS

Houde et al. (1998) "Sensorimotor adaptation in speech production" Science, vol. 279, pp. 1213-1216.

Thomas B. Sheridan (1993) "Space Teleoperation Through Time Delay: Review and Prognosis" IEEE Transactions on Robotics and Automation, vol. 9, No. 5, pp. 592-606.

\* cited by examiner

PHYSICAL MOTION FEEDBACK APPARATUS, PHYSICAL MOTION FEEDBACK METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2019/021731, filed on 31 May 2019, the disclosure of which is hereby incorporated herein by reference in its entirety.

TECHNICAL FIELD

The present invention relates to a technique for visually feeding back a motion of a subject in physical exertion.

BACKGROUND ART

Delayed Feedback (DAF) and Transformed Auditory Feedback (TAF) are known techniques for encouraging the subject to make a change in how he or she is speaking by modulating his or her voice at a time of auditory feedback. DAF is a technique of feeding back a subject's speaking from a headphone with a predetermined delay time, and has been reported to lead the subject to stammer and make a slow speech, which results in making the subject difficult to speak (Non Patent Literature 1). On the other hand, TAF is a technique of converting formant frequency information about sound to be fed back. It has been reported that when TAF is used, a compensation response is observed in which the subject attempts to make a speech with a frequency lowered or raised to cancel a change in the sound (Non Patent Literature 2).

In the field of physical exertion, it has been known that when an image of an object manipulated by a subject is displayed with delay due to transmission delay and the like, the subject feels a sense of resistance in the manipulation, for example, feels that the object is heavy. As a technique of suppressing this sense of resistance in the manipulation, predictive display has been proposed in which non-delayed video is projected as a predictively generated CG image (Non Patent Literature 3).

CITATION LIST

Non Patent Literature

Non Patent Literature 1: B. S. Lee, "Artificial stutter," Journal of Speech & Hearing Disorders, Vol. 16, Issue 1, pp. 53 to 55, 1951.

Non Patent Literature 2: J. F. Houde and M. I. Jordan, "Sensorimotor Adaptation in Speech Production," Science, Vol. 279, Issue 5354, pp. 1213 to 1216, 1 998.

Non Patent Literature 3: T. B. Sheridan, "Space Teleoperation Through Time Delay: Review and Prognosis", IEEE TRANSACTIONS ON ROBOTICS AND AUTOMATION, Vol. 9, Issue 5, pp. 592 to 606, 1993.

SUMMARY OF THE INVENTION

Technical Problem

Both DAF and TAF are techniques related to speaking operations and are not techniques for visually feeding back the motion of the subject in physical exertion.

In addition, it is unknown how a motion of a subject can be changed as a result of performing a modulation, as in DAF or TAF, when the motion is visually fed back to the subject in real time. To elucidate such an effect, a technique of feeding back a modulated motion of the subject in real time is required. Unfortunately, the technique as described in Non Patent Literature 3 where a CG image is generated using a system behavior prediction model involves a heavy calculation load, and thus is difficult to use for the real time feedback. Thus, currently, there is no technique available for real time feedback of a modulated motion of the subject.

Thus, none of the techniques disclosed in Non Patent Literatures 1 to 3 is usable for visually feeding back the motion of the subject in real time.

Thus, an object of the present invention is to provide a technique for feeding back an image obtained by modulating a motion of a subject in real time.

Means for Solving the Problem

An aspect of the present invention is a physical exertion feedback device including: a modulation unit configured to generate, as a modulated image, an image reflecting modulated motion time-series data, the modulated motion time-series data being obtained by modulating data within a partial time period of input motion time-series data representing a motion of a subject using reference motion time-series data representing a motion of a teacher, the modulated motion time-series data representing a motion for correcting the motion of the subject; and a presentation unit configured to present the modulated image to the subject, wherein the modulated motion time-series data is, at respective time points from a time point at which the subject starts the motion to a predetermined time point which is hereinafter referred to as a modulation start time point, motion time-series data that matches the input motion time-series data, and is, at respective time points after the modulation start time point, motion time-series data obtained by modulating the input motion time-series data using a predetermined modulation method.

Effects of the Invention

With the present invention, an image obtained by modulating a motion of a subject can be fed back in real time.

DESCRIPTION OF EMBODIMENTS

Hereinafter, embodiments of the present invention will be described in detail. Components having the same function are denoted by the same reference numeral, and redundant description thereof will be omitted.

First Embodiment

A physical exertion feedback device 100 presents an image indicating a motion of a subject to the subject in real time. The image indicating the motion of the subject is not a raw image obtained by capturing how the subject is exercising, but is an image obtained by modulating data about an image abstracted so that the subject can easily recognize his or her motion. Examples of the abstracted image include: an image in which the subject and the background can be clearly distinguished from each other, such as an image indicating the skeleton and joins of the subject; and an image in which the motion of the subject is abstracted in an easily visually recognizable manner, so that the physical exertion of the subject can be distinguished from the background or the like.

Figure 1:
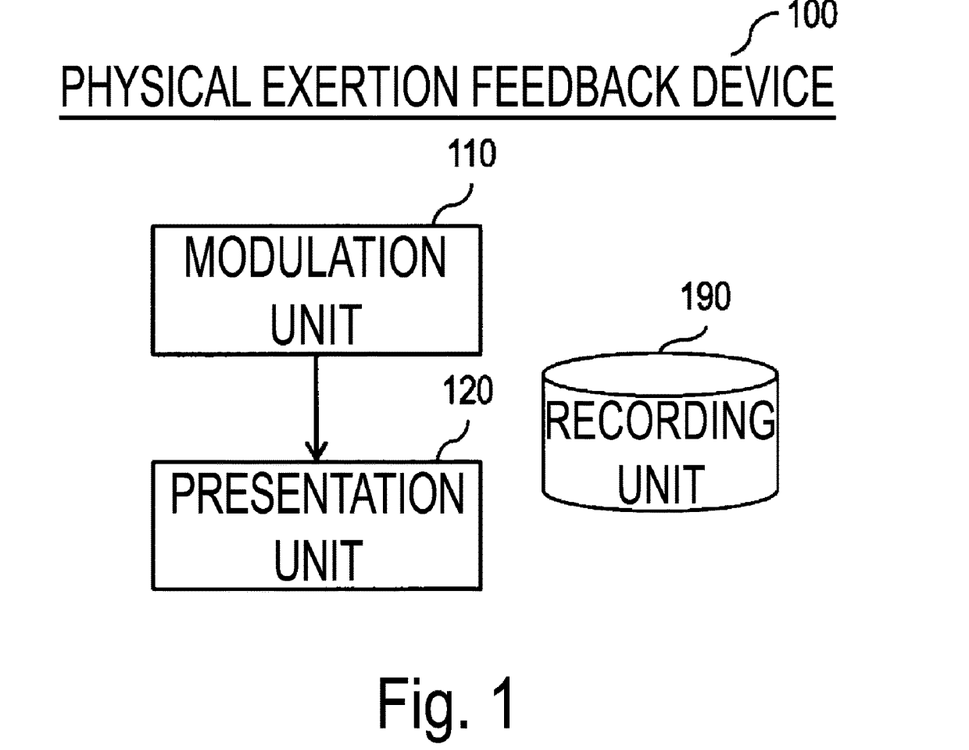
FIG. 1 is a block diagram illustrating an example of a configuration of a physical exertion feedback device 100.
Figure 2:
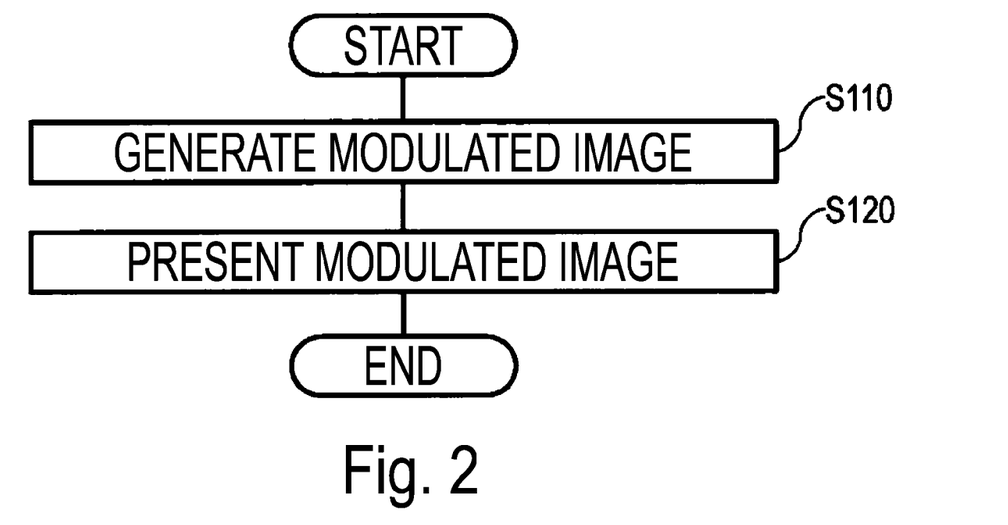
FIG. 2 is a flowchart illustrating an example of an operation performed by the physical exertion feedback device 100.

The physical exertion feedback device 100 will be described below with reference to FIGS. 1 and 2. FIG. 1 is a block diagram illustrating a configuration of the physical exertion feedback device 100. FIG. 2 is a flowchart illustrating an operation performed by the physical exertion feedback device 100. As illustrated in FIG. 1, the physical exertion feedback device 100 includes a modulation unit 110, a presentation unit 120, and a recording unit 190.

Recording Unit 190

The recording unit 190 is a component that appropriately records information required for processing executed by the physical exertion feedback device 100. The recording unit 190 records reference motion time-series data representing a motion of a teacher. This teacher is, for example, a person skilled in physical exertion performed by the subject or the subject himself or herself in good condition. The motion time-series data is data about an image abstracted so that the subject can easily recognize his or her motion. Examples of the data include a list of positional information about a representative point of a human body at each time point acquired using motion capture and a skeleton estimation technique. As the representative point of a human body, for example, a joint can be used. Generally, a plurality of the representative points are used. Thus, the reference motion time-series data can be regarded as a list of positional information of each representative point of the body of the teacher making physical exertion at each time point. The reference motion time-series data serves as a teacher signal based on a motion of a skilled person or the subject in good condition.

Modulation Unit 110

The modulation unit 110 receives input motion time-series data representing the motion of the subject. The input motion time-series data is acquired using a technique that is the same as that for acquiring the reference motion time-series data, and is a list of positional information about each representative point of the body of the subject making physical exertion at each time point.

The modulation unit 110 generates modulated motion time-series data representing a motion for correcting the motion of the subject by modulating the input motion time-series data using the reference motion time-series data, and generates, as a modulated image, an image reflecting the modulated motion time-series data thus generated. Here, the modulated motion time-series data is motion time-series data that matches the input motion time-series data at each time point from a time point at which the subject starts the motion to a predetermined time point (hereinafter referred to as a modulation start time point), and is, at each time point after the modulation start time point, motion time-series data obtained by modulating the input motion time-series data using a predetermined modulation method. Thus, the modulation unit 110 modulates the data within a partial time period of the input motion time-series data, to generate the modulated motion time-series data.

The modulation method used for generating the modulated motion time-series data will be described below. Note that the input motion time-series data and the reference motion time-series data are synchronized in advance so that the time point at which the subject starts the motion in the input motion time-series data matches the time point at which the teacher starts the motion in the reference motion time-series data.

The modulation method is roughly classified into: a spatial modulation method in which the input motion time-series data is modulated to correct a spatial difference between the motion of the subject and the motion of the teacher; and a temporal modulation method in which the input motion time-series data is modulated to correct a temporal difference between the motion of the subject and the motion of the teacher.

Example 1: Spatial Modulation Method

The modulation unit 110 calculates the difference between the positional information about each representative point of the body of the subject and the positional information about each representative point of the body of the teacher at a time point t after the modulation start time point, and calculates a representative value (e.g., average value or median value) of the difference at the time point t. Then, for each of the representative points of the body of the subject, the modulation unit 110 spatially changes the positional information about the representative point of the body of the subject using a predetermined method by a predetermined amount, so that the difference regarding the representative point is shifted toward the representative value. Here, the predetermined amount can be freely set within a range in which the subject can recognize that he or she is making the motion (that is, a range in which the subject can recognize that he or she is the subjection of the physical exertion). Still, the predetermined amount is preferably an amount capable of inducing the subject to change his or her physical exertion, and thus is required to be in a range not exceeding ½ of the absolute value of the representative value of the difference. Furthermore, changing using the predetermined method refers to changing the positional information by the predetermined amount one time or changing the positional information by an amount smaller than the predetermined amount a plurality of times so as to gradually change the positional information by the predetermined amount.

Example 2: Spatial Modulation Method

The modulation unit 110 calculates the difference between the positional information about each representative point of the body of the subject and the positional information about each representative point of the body of the teacher at a time point t after the modulation start time point, and calculates a representative value (e.g., average value or median value) of the difference at the time point t. Then, for each of the representative points of the body of the subject, the modulation unit 110 spatially changes positional information about the representative point of the body of the subject using a predetermined method by a predetermined amount, so that the difference regarding the representative point is shifted away from the representative value.

Example 3: Temporal Modulation Method

The modulation unit 110 calculates a difference between the positional information about each representative point of the teacher at the time point t after the modulation start time point and the positional information about each representative point of the body of the subject at a time point included in the proximity of the time point t. Then, the modulation unit 110 calculates a representative value of the difference for each time point included in the proximity of the time point t, and determines the time point at which the absolute value of the representative value of the difference becomes the smallest, as the time point corresponding to the time point t. This proximity of the time point t refers to a range from a time point t−δ to a time point t+δ (δ is a predetermined positive number). Then, when the time point corresponding to the time point t is earlier than the time point t, the modulation unit 110 makes a temporal change in the positional information about each representative point of the body of the subject using a predetermined method by a predetermined amount so that the time point corresponding to the time point t is shifted away from the time point t (to make the time point corresponding to the time point t arrive earlier). Furthermore, changing using the predetermined method refers to changing the positional information by the predetermined amount one time or changing the positional information by an amount smaller than the predetermined amount a plurality of times so as to gradually change the positional information by the predetermined amount.

Example 4: Temporal Modulation Method

The modulation unit 110 calculates a difference between the positional information about each representative point of the body of the teacher at the time point t after the modulation start time point and the positional information about each representative point of the body of the subject at a time point included in the proximity of the time point t, calculates a representative value of the difference for each time point included in the proximity of the time point t, and determines that a time point at which the absolute value of the representative value of the difference becomes the smallest is a time point corresponding to the time point t. Then, when the time point corresponding to the time point t is earlier than the time point t, the modulation unit 110 makes a temporal change in the positional information about each representative point of the body of the subject using a predetermined method by a predetermined amount so that the time point corresponding to the time point t is shifted toward the time point t (to make the time point corresponding to the time point t arrive later).

Presentation Unit 120

The presentation unit 120 is a component for presenting a modulated image generated by the modulation unit 110 to the subject, and may be, for example, a display. Thus, the presentation unit 120 presents, to the subject, an image visualizing the positions of the representative points of the body of the subject at each time point.

An operation performed by the physical exertion feedback device 100 is described with reference to FIG. 2. In S110, the modulation unit 110 receives reference motion time-series data and generates modulated motion time-series data by modulating input motion time-series data using the reference motion time-series data. Then, the modulation unit 110 generates and outputs, as a modulated image, an image reflecting the modulated motion time-series data.

In S120, the presentation unit 120 receives the modulated image generated in S110, and presents the modulated image to the subject.

Now, reasons why the modulation start time point is used and why a result of modulating the captured image of the motion of the subject is not used will be described. First, the reason why the modulation start time point is used will be described. When the modulated motion time-series data is generated, the input motion time-series data that is the time-series data about his or her motion itself is used from the time point at which the subject has started the motion to the modulation start time point so that the subject can recognize that the motion indicated by the abstracted image presented to the subject is his or her motion (so that he or she can recognize that he or she is the subject of the physical exertion). In a case of DAF or TAF, the voice of the subject is auditory fed back to him or her constantly, and thus the subject can recognize that the voice is his or her voice even if there is no adaptation period. On the other hand, when a feedback technique such as TAF or DAF is applied in the field of images, the physical exertion of the subject is not constantly visually fed back to him or her. On top of that, the image of the subject visually fed back is not an actual image, but is an abstracted image of the motion. Thus, the image indicating the motion of the subject is presented with no modulation in real time for a predetermined period of time, which is considered to be necessary to cause the subject to recognize that the image currently presented (visually fed back) is representing his or her motion.

Now, a reason why a result of modulating the captured image of the motion of the subject is not used will be described. Feedback of the captured image of the motion of the subject is known to involve problems in that the modulation can be easily noticed due to the distortion of the background and in that the image cannot be fed back in real time because it takes a lot of time to process the modulation. Furthermore, the captured image of the motion of the subject may include too much information, and thus feeding back the modulated image to the subject might not be effective. In view of this, an image based only on the motion of each representative point such as a joint is used in the modulation unit 110, so that recognition of the motion of the subject is facilitated. With such an image, the modulation cannot be easily noticed by the subject, and real time feedback can be implemented because the modulation processing involves a smaller amount of calculation.

With the invention according to the present embodiment, the image obtained by modulating the motion of the subject can be fed back in real time.

Second Embodiment

The physical exertion feedback device 100 executes modulation processing that has been set in advance. On the other hand, a physical exertion feedback device 200 according to the present embodiment executes modulation processing in accordance with a modulation parameter set at the time of execution (a parameter designating the contents of the modulation processing and timing when the modulation starts).

Figure 3:
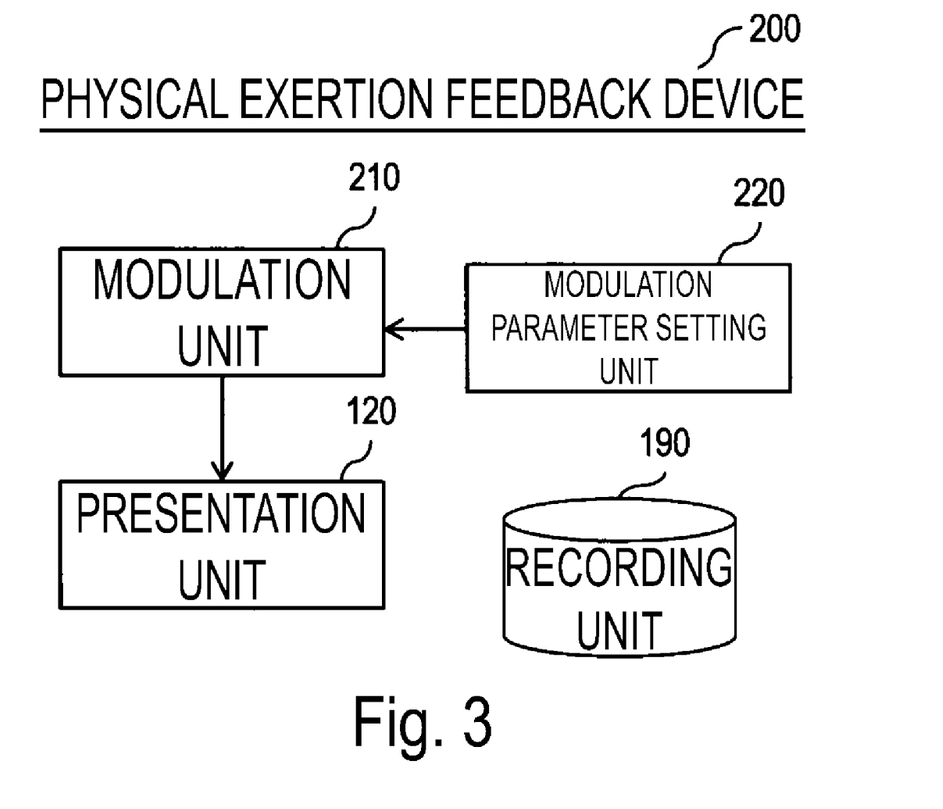
FIG. 3 is a block diagram illustrating an example of a configuration of a physical exertion feedback device 200.
Figure 4:
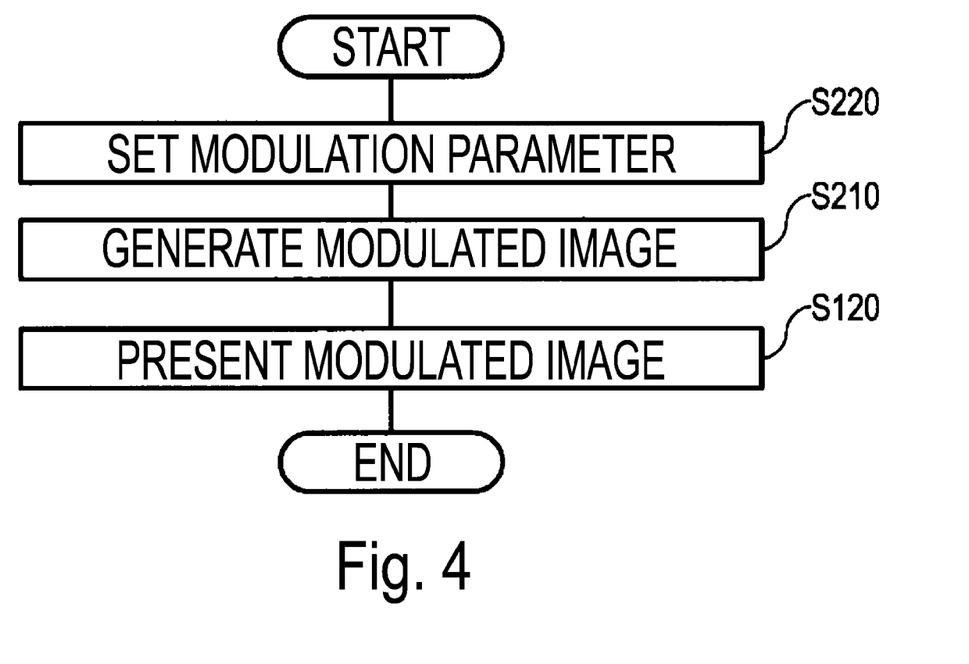
FIG. 4 is a flowchart illustrating an example of an operation performed by the physical exertion feedback device 200.

The physical exertion feedback device 200 will be described below with reference to FIGS. 3 and 4. FIG. 3 is a block diagram illustrating a configuration of the physical exertion feedback device 200. FIG. 4 is a flowchart illustrating an operation performed by the physical exertion feedback device 200. As illustrated in FIG. 3, the physical exertion feedback device 200 includes a modulation parameter setting unit 220, a modulation unit 210, a presentation unit 120, and a recording unit 190. Thus, the physical exertion feedback device 200 is different from the physical exertion feedback device 100 in the point of further including the modulation parameter setting unit 220 and in the point of including the modulation unit 210 instead of the modulation unit 110.

Modulation Parameter Setting Unit 220

The modulation parameter setting unit 220 outputs, to the modulation unit 210, a modulation timing parameter indicating the modulation start time point and a modulation content parameter used in the predetermined modulation method. The modulation parameters (that is, the modulation timing parameter and the modulation content parameter) may be input to the modulation parameter setting unit 220 by the user using an input unit (not illustrated) such as a keyboard or a mouse.

Examples of the modulation content parameter in the case of the spatial modulation method include the following:

(1) A parameter indicating whether a modulation is performed so that the motion of the subject is spatially shifted toward the motion of the teacher, or is performed so that the motion of the subject is spatially shifted away from the motion of the teacher (2) A parameter indicating a correction amount related to the spatial shift between the motion of the subject and the motion of the teacher (The predetermined amount in Example 1 and Example 2 in the first embodiment corresponds to these parameters.)

(3) A parameter indicating a method of applying the modulation (The predetermined method in Example 1 and Example 2 in the first embodiment corresponds to this parameter.)

Examples of the modulation content parameter in the case of the temporal modulation method include the following:

(1) A parameter indicating whether a modulation is performed so that the motion of the subject is temporarily shifted toward the motion of the teacher, or is performed so that the motion of the subject is temporarily shifted away from the motion of the teacher (2) A parameter indicating a correction amount related to the temporal shift between the motion of the subject and the motion of the teacher (The predetermined amount in Example 3 and Example 4 in the first embodiment corresponds to these parameter.)

(3) A parameter indicating a method of applying the modulation (The predetermined method in Example 3 and Example 4 in the first embodiment corresponds to this parameter.)

Parameters indicating whether only the spatial modulation is applied, only the temporal modulation is applied, or both of the spatial modulation and the temporal modulation are applied may also be set as the modulation content parameter.

Modulation Unit 210

The input motion time-series data representing the motion of the subject and the modulation parameter are input to the modulation unit 210. Then, the modulation parameter thus input is set in the modulation unit 210.

The modulation unit 210 generates modulated motion time-series data representing a motion for correcting a motion of the subject by modulating the input motion time-series data using the reference motion time-series data, and generates, as a modulated image, an image reflecting the modulated motion time-series data thus generated. Here, the modulated motion time-series data is motion time-series data that matches the input motion time-series data at each time point from a time point at which the subject starts the motion to a predetermined time point (hereinafter referred to as a modulation start time point), and is, at each time point after the modulation start time point, motion time-series data obtained by modulating the input motion time-series data using a predetermined modulation method. The predetermined modulation method is a method of modulating the input motion time-series data for correcting the spatial shift between the motion of the subject and the motion of the teacher and/or the temporal shift between the motion of the subject and the motion of the teacher. Specifically, the modulation unit 210 modulates the input motion time-series data using the modulation method designated by the modulation parameter.

An operation performed by the physical exertion feedback device 200 is described with reference to FIG. 4. In S220, the modulation parameter setting unit 220 outputs the modulation parameter input by the user using the input unit to the modulation unit 210.

In S210, the modulation unit 210 receives the reference motion time-series data and the modulation parameter output in S220, generates modulated motion time-series data by modulating the input motion time-series data using the reference motion time-series data, and generates and outputs, as a modulated image, an image reflecting the modulated motion time-series data. In this process, the modulation unit 210 modulates the input motion time-series data using the modulation method designated by the modulation parameter.

In S120, the presentation unit 120 receives the modulated image generated in S210, and presents the modulated image to the subject.

With the invention according to the present embodiment, the image obtained by modulating the motion of the subject can be fed back in real time.

Modifications

The viewpoint of the image presented by the presentation unit 120 to the subject may be switchable. For example, when the captured image of the motion of the subject as viewed from the front is presented, the presentation unit 120 may be capable of switching between presentation of a horizontally flipped image, that is, a mirror image, and presentation of an un-flipped image. Furthermore, the presentation unit 120 may be capable of switching the viewpoint so that the image as viewed from the ceiling can be presented. In this case, the modulation content parameter for determining the spatial modulation may include information about the viewpoint of the image and about a parameter designating the modulation such as horizontal flipping or vertical flipping, and the modulation unit 110 may further perform the modulation in accordance with the parameter.

Additional Note

Figure 5:
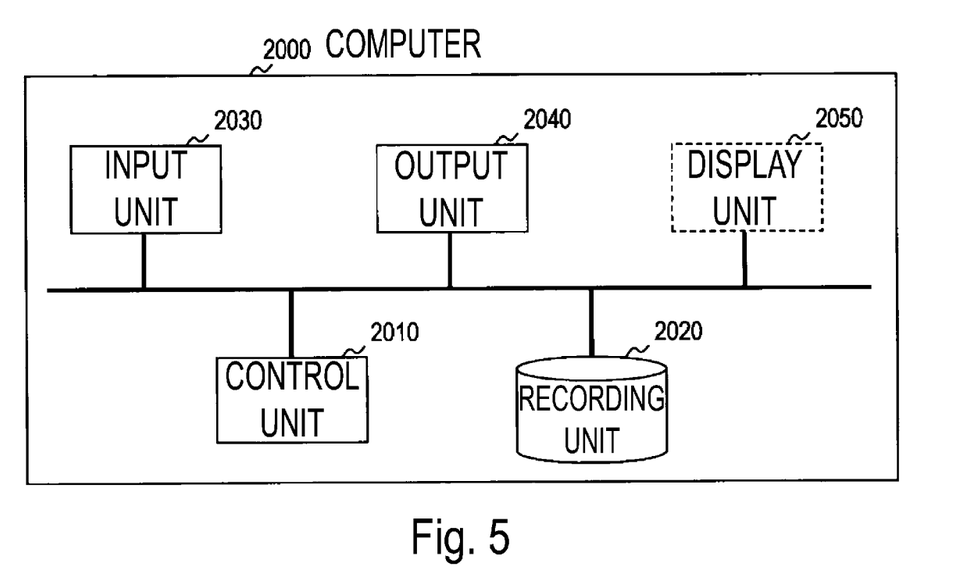
FIG. 5 is a diagram illustrating an example of a functional configuration of a computer achieving each device according to the embodiment of the present invention.

FIG. 5 is a diagram illustrating an example of a functional configuration of a computer achieving each device described above. The processing in each device described above can be executed by causing a recording unit 2020 to load a program for causing the computer to function as each device described above, and causing a controller 2010, an input unit 2030, an output unit 2040, and the like to operate.

The device according to the present invention includes, for example, as single hardware entity, an input part to which a keyboard, or the like, can be connected, an output part to which a liquid crystal display, or the like, can be connected, and a communication part to which a communication device (for example, a communication cable) capable of performing communication with outside of the hardware entity can be connected, a central processing unit (CPU, which may include a cache memory, a register, or the like), a RAM or ROM which is a memory, an external storage device which is a hard disk, and a bus which connects the input part, the output part, the communication part, the CPU, the RAM, the ROM, and the external storage device so as to be enable exchange of data. Further, as necessary, the hardware entity may be provided with a device (drive) which can read and write data in and from a recording medium such as a CD-ROM. Physical entity having such hardware resources includes a general-purpose computer, or the like.

In the external storage device of the hardware entity, programs necessary for implementing the above functions and data necessary for processing of the programs are stored (not limited to the external storage device, and, for example, the programs may be stored in a ROM which is a read-only storage device). Further, data, or the like, obtained through the processing of these programs is stored in a RAM or an external storage device as appropriate.

In the hardware entity, each program stored in the external storage device (or the ROM, or the like) and data necessary for processing of each program are read into a memory as necessary, and are interpreted/executed by the CPU as appropriate. As a result, the CPU implements a predetermined function (respective components expressed as the above-described, part, means, or the like).

The present invention is not limited to the above-described embodiments, and can be modified as appropriate without departing from the spirit of the present invention. In addition, the processing described in the above embodiments may be executed not only in time series in accordance with the order of description but also in parallel or individually in accordance with the processing capability of the device which executes the processing or as necessary.

As described above, in a case where the processing functions in the hardware entity (the device of the present invention) described in the above embodiments are implemented by a computer, the processing content of the functions that the hardware entity should have is described as a program. Then, by executing this program on a computer, the processing functions of the above hardware entity are implemented on the computer.

The program describing this processing content can be recorded on a computer-readable recording medium. As the computer-readable recording medium, for example, any recording medium such as a magnetic recording device, an optical disk, a magneto-optical recording medium, and a semiconductor memory may be used. Specifically, for example, a hard disk device, a flexible disk, a magnetic tape or the like, can be used as the magnetic recording device, a DVD (Digital Versatile Disc), a DVD-RAM (Random Access Memory), a CD-ROM (Compact Disc Read Only) Memory), a CD-R (Recordable)/RW (ReWritable), or the like, can be used as the optical disk, an MO (Magneto-Optical disc), or the like, can be used as the magneto-optical recording medium, and, an EEP-ROM (Electronically Erasable and Programmable-Read Only Memory), or the like, can be used as the semiconductor memory.

Further, the program is distributed by, for example, selling, transferring, or lending a portable recording medium such as a DVD or a CD-ROM in which the program is recorded. Still further, the program may be distributed by storing the program in a storage device of a server computer and transferring the program from the server computer to other computers via a network.

A computer which executes such a program first stores, for example, the program recorded on a portable recording medium or the program transferred from a server computer in the own storage device once. When executing the processing, the computer reads the program stored in the own storage device and executes the processing in accordance with the read program. Further, as another execution form of this program, the computer may directly read the program from the portable recording medium and execute processing in accordance with the program, or, further, may sequentially execute the processing in accordance with the received program every time the program is transferred from the server computer to the computer. Further, the above-described processing may be executed using so-called application service provider (ASP) service which implements processing functions only through instruction of execution of the program and acquisition of the result without the program being transferred from the server computer to the computer. Note that the program in the present embodiment includes information which is used for processing by an electronic computer and which is equivalent to the program (data, or the like, which is not a direct command to the computer but has property that defines the processing of the computer).

While, in this embodiment, the hardware entity is configured by causing a predetermined program to be executed on a computer, the processing content may be implemented by hardware at least partially.

The above description of the embodiments of the present invention has been presented for purposes of illustration and description. There is no intention to be exhaustive and there is no intention to limit the invention to the exact disclosed form. Modifications and variations are possible from the above teachings. The embodiments are chosen and expressed in order to provide the best illustration of the principle of the present invention, and to enable those skilled in the art to adapt the present invention in various embodiments so as to be suitable for considered practical use, and make it possible to utilize the present invention while various modifications are made. All such modifications and variations are within the scope of the present invention as defined by the appended claims, which are construed in accordance with the breadth that is provided impartially, legally and fairly.

The invention claimed is:

1. A physical exertion feedback device comprising a processor configured to execute operations comprising:
dynamically generating, as a modulated image, an image reflecting modulated motion time-series data, the modulated motion time-series data being obtained by modulating, in real time, data within a partial time period of input motion time-series data representing a motion of a subject using reference motion time-series data representing a motion of a teacher, the modulated motion time-series data representing a motion for correcting the motion of the subject,
the modulating further comprises modulating the input motion time-series data to correct a spatial shift between the motion of the subject and the motion of the teacher and/or to correct a temporal shift between the motion of the subject and the motion of the teacher,
the motion time-series data representing the motion is a list of positional information about representative points of a human body at respective time points,
the modulating the input motion time-series data further comprises, as predetermined steps:

calculating a representative value of a difference between positional information about representative points of a body of the teacher and positional information about representative points of a body of the subject at a time point t after the modulation start time point, and spatially changing the positional information about each representative point of the body of the subject to make the difference shifted toward the representative value or shifted away from the representative value;

setting a modulation timing parameter indicating the modulation start time point and a modulation content parameter to be used in the modulating the input motion time-series data, wherein when the modulating the input motion time-series data represents modulating the input motion time-series data to correct the spatial shift between the motion of the subject and the motion of the teacher, the modulation content parameter includes a parameter indicating whether the modulation is performed to make the motion of the subject spatially shifted toward the motion of the teacher or performed to make the motion of the subject spatially shifted away from the motion of the teacher, a parameter indicating an amount of the correction for the spatial shift between the motion of the subject and the motion of the teacher, and a parameter indicating a method of performing the modulation, when the modulating the input motion time-series data represents modulating the input motion time-series data to correct the temporal shift between the motion of the subject and the motion of the teacher, the modulation content parameter includes a parameter indicating whether the modulation is performed to make the motion of the subject temporarily shifted toward the motion of the teacher or performed to make the motion of the subject temporarily shifted away from the motion of the teacher, a parameter indicating an amount of the correction for the temporal shift between the motion of the subject and the motion of the teacher, and a parameter indicating a method of performing the modulation, and the modulating the input motion time-series data is based on the modulation timing parameter and the modulation content parameter set in the modulator; and presenting, in real time, the modulated image to the subject, wherein the modulated motion time-series data is, at respective time points from a time point at which the subject starts the motion to a predetermined time point which is hereinafter referred to as a modulation start time point, motion time-series data that matches the input motion time-series data, and is, at respective time points after the modulation start time point, motion time-series data obtained by modulating the input motion time-series data, and the modulating the data is based on at least one of spatial modulation or temporal modulation of the data.

2. The physical exertion feedback device according to claim 1, wherein the motion time-series data representing the motion is a list of positional information about representative points of a human body at respective time points, and the modulating the input motion time-series data further comprises, as predetermined steps:

calculating a difference between positional information about representative points of a body of the teacher at a time point t after the modulation start time point and positional information about representative points of a body of the subject at each time point included in proximity of the time point t;

calculating a representative value of the difference at each time point included in the proximity of the time point t;

determining that a time point at which an absolute value of the representative value of the difference becomes smallest is a time point corresponding to the time point t; and temporarily changing the positional information about each representative point of the body of the subject to make the time point corresponding to the time point t shifted away from the time point t or to make the time point corresponding to the time point t shifted toward the time point t, when the time point corresponding to the time point t is earlier than the time point t.

3. A physical exertion feedback method comprising:

dynamically generating as a modulated image, an image reflecting modulated motion time-series data, the modulated motion time-series data being obtained by modulating, in real time, data within a partial time period of input motion time-series data representing a motion of a subject using reference motion time-series data representing a motion of a teacher, the modulated motion time-series data representing a motion for correcting the motion of the subject, the modulating further comprises modulating the input motion time-series data to correct a spatial shift between the motion of the subject and the motion of the teacher and/or to correct a temporal shift between the motion of the subject and the motion of the teacher, the motion time-series data representing the motion is a list of positional information about representative points of a human body at respective time points, the modulating the input motion time-series data further comprises, as predetermined steps:

calculating a representative value of a difference between positional information about representative points of a body of the teacher and positional information about representative points of a body of the subject at a time point t after the modulation start time point, and spatially changing the positional information about each representative point of the body of the subject to make the difference shifted toward the representative value or shifted away from the representative value;

setting a modulation timing parameter indicating the modulation start time point and a modulation content parameter to be used in the modulating the input motion time-series data, wherein when the modulating the input motion time-series data represents modulating the input motion time-series data to correct the spatial shift between the motion of the subject and the motion of the teacher, the modulation content parameter includes a parameter indicating whether the modulation is performed to make the motion of the subject spatially shifted toward the motion of the teacher or performed to make the motion of the subject spatially shifted away from the motion of the teacher, a parameter indicating an amount of the correction for the spatial shift between the motion of the subject and the motion of the teacher, and a parameter indicating a method of performing the modulation, when the modulating the input motion time-series data represents modulating the input motion time-series data to correct the temporal shift between the motion of the subject and the motion of the teacher, the modulation content parameter includes a parameter indicating whether the modulation is performed to make the motion of the subject temporarily shifted toward the motion of the teacher or performed to make the motion of the subject temporarily shifted away from the motion of the teacher, a parameter indicating an amount of the correction for the temporal shift between the motion of the subject and the motion of the teacher, and a parameter indicating a method of performing the modulation, and the modulating the input motion time-series data is based on the modulation timing parameter and the modulation content parameter set in the modulator; and presenting, in real time, the modulated image to the subject, wherein the modulated motion time-series data is, at respective time points from a time point at which the subject starts the motion to a predetermined time point which is hereinafter referred to as a modulation start time point, motion time-series data that matches the input motion time-series data, and is, at respective time points after the modulation start time point, motion time-series data obtained by modulating the input motion time-series data, and the modulating the data is based on at least one of spatial modulation or temporal modulation of the data.

4. The physical exertion feedback method according to claim 3, wherein the motion time-series data representing the motion is a list of positional information about representative points of a human body at respective time points, and the modulating the input motion time-series data further comprises:

calculating a difference between positional information about representative points of a body of the teacher at a time point t after the modulation start time point and positional information about representative points of a body of the subject at each time point included in proximity of the time point t;

calculating a representative value of the difference at each time point included in the proximity of the time point t;

determining that a time point at which an absolute value of the representative value of the difference becomes smallest is a time point corresponding to the time point t; and temporarily changing the positional information about each representative point of the body of the subject to make the time point corresponding to the time point t shifted away from the time point t or to make the time point corresponding to the time point t shifted toward the time point t, when the time point corresponding to the time point t is earlier than the time point t.

5. A computer-readable non-transitory recording medium storing computer-executable program instructions that when executed by a processor causes a computer system to:

dynamically generate as a modulated image, an image reflecting modulated motion time-series data, the modulated motion time-series data being obtained by modulating, in real time, data within a partial time period of input motion time-series data representing a motion of a subject using reference motion time-series data representing a motion of a teacher, the modulated motion time-series data representing a motion for correcting the motion of the subject the modulating further comprises modulating the input motion time-series data to correct a spatial shift between the motion of the subject and the motion of the teacher and/or to correct a temporal shift between the motion of the subject and the motion of the teacher, the motion time-series data representing the motion is a list of positional information about representative points of a human body at respective time points, the modulating the input motion time-series data further comprises, as predetermined steps:

calculating a representative value of a difference between positional information about representative points of a body of the teacher and positional information about representative points of a body of the subject at a time point t after the modulation start time point, and spatially changing the positional information about each representative point of the body of the subject to make the difference shifted toward the representative value or shifted away from the representative value;

set a modulation timing parameter indicating the modulation start time point and a modulation content parameter to be used in the modulating the input motion time-series data, wherein when the modulating the input motion time-series data represents modulating the input motion time-series data to correct the spatial shift between the motion of the subject and the motion of the teacher, the modulation content parameter includes a parameter indicating whether the modulation is performed to make the motion of the subject spatially shifted toward the motion of the teacher or performed to make the motion of the subject spatially shifted away from the motion of the teacher, a parameter indicating an amount of the correction for the spatial shift between the motion of the subject and the motion of the teacher, and a parameter indicating a method of performing the modulation, when the modulating the input motion time-series data represents modulating the input motion time-series data to correct the temporal shift between the motion of the subject and the motion of the teacher, the modulation content parameter includes a parameter indicating whether the modulation is performed to make the motion of the subject temporarily shifted toward the motion of the teacher or performed to make the motion of the subject temporarily shifted away from the motion of the teacher, a parameter indicating an amount of the correction for the temporal shift between the motion of the subject and the motion of the teacher, and a parameter indicating a method of performing the modulation, and the modulating the input motion time-series data is based on the modulation timing parameter and the modulation content parameter set in the modulator; and present, in real time, the modulated image to the subject, wherein the modulated motion time-series data is, at respective time points from a time point at which the subject starts the motion to a predetermined time point which is hereinafter referred to as a modulation start time point, motion time-series data that matches the input motion time-series data, and is, at respective time points after the modulation start time point, motion time-series data obtained by modulating the input motion time-series data, and the modulating the data is based on at least one of spatial modulation or temporal modulation of the data.

6. The computer-readable non-transitory recording medium of claim 5, wherein
the motion time-series data representing the motion is a list of positional information about representative points of a human body at respective time points, and
the modulating the input motion time-series data further comprises:
calculating a difference between positional information about representative points of a body of the teacher at a time point t after the modulation start time point and positional information about representative points of a body of the subject at each time point included in proximity of the time point t;
calculating a representative value of the difference at each time point included in the proximity of the time point t;
determining that a time point at which an absolute value of the representative value of the difference becomes smallest is a time point corresponding to the time point t; and
temporarily changing the positional information about each representative point of the body of the subject to make the time point corresponding to the time point t shifted away from the time point t or to make the time point corresponding to the time point t shifted toward the time point t, when the time point corresponding to the time point t is earlier than the time point t.

* * * * *